(12) United States Patent
Iwano et al.

(10) Patent No.: US 6,955,607 B2
(45) Date of Patent: Oct. 18, 2005

(54) STRUCTURE FOR PREVENTING WATER OR THE LIKE FROM INTRUDING IN BOOT FOR UNIVERSAL JOINT

(75) Inventors: Kazuhiro Iwano, Tochigi (JP); Masaru Naoi, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/093,145

(22) Filed: Mar. 7, 2002

(65) Prior Publication Data
US 2003/0060293 A1 Mar. 27, 2003

(30) Foreign Application Priority Data
Sep. 27, 2001 (JP) ........................................ 2001-298377

(51) Int. Cl.[7] .................................................. F16D 3/84
(52) U.S. Cl. .......................... 464/17; 464/173; 277/928
(58) Field of Search ......................... 464/17, 173, 175; 277/634, 635, 636, 642, 926, 928

(56) References Cited

U.S. PATENT DOCUMENTS

| | | | | |
|---|---|---|---|---|
| 3,248,955 A | * | 5/1966 | Templeton | .............. 277/928 X |
| 4,210,002 A | * | 7/1980 | Dore | ........................... 464/175 |
| 4,392,838 A | * | 7/1983 | Welschof et al. | ............ 464/175 |
| 4,556,400 A | * | 12/1985 | Krude et al. | ............. 277/928 X |
| 5,297,996 A | | 3/1994 | Drafa | |
| 5,876,149 A | * | 3/1999 | Dorr et al. | ............... 277/635 X |

FOREIGN PATENT DOCUMENTS

| | | |
|---|---|---|
| JP | 828704 | 2/1996 |
| JP | 2566324 | 5/1997 |

\* cited by examiner

Primary Examiner—Greg Binda
(74) Attorney, Agent, or Firm—Drum & Roth

(57) ABSTRACT

A structure is disclosed for preventing water or the like from intruding in a boot for a universal joint which includes: a communication passage for communicating inner and outer portions of the boot, the communication passage being provided in an end surface of a fitting portion of the boot sealing a connecting space of the universal joint to a member to be mounted at a time of fitting and attaching one end portion of the boot to the member to be mounted, wherein a protruding shielding portion opposing to the end surface of the fitting portion is provided in a close attached portion of the end surface of the fitting portion of the boot in the member to be mounted.

13 Claims, 4 Drawing Sheets

STRUCTURE FOR PREVENTING WATER OR THE LIKE FROM INTRUDING IN BOOT FOR UNIVERSAL JOINT

BACKGROUND OF THE INVENTION

1. Field of the Invention

The present invention relates to a structure for preventing water or the like from intruding in a boot for a universal joint, which is used in a propeller shaft or the like.

2. Description of the Related Art

In a conventional vehicle, a propeller shaft transmitting an output of an engine to a rear wheel is separated in an axial direction, and a universal joint connects separated front and rear shafts. Further, a boot is employed for preventing dust, dirt water or the like from intruding into a connected space between an outer element and inner element of the universal joint. The structure is made such that one end portion of the boot is fitted to the inner element and another end portion is fitted to the outer element.

In the conventional art, to avoid an abnormal expansion and compression, and a resultant breakage of the boot which may result from an internal pressure change of the boot caused by a temperature change due to heat generated in the universal joint, or an internal pressure change of the boot caused by sliding of the universal joint, a groove-like internal pressure adjusting communication passage is provided in a fitting portion of the boot to the inner element. The purpose of this is to communicate internal and external portions of the boot (Japanese Patent Application Laid-Open (JP-A) No. 8-28704).

In the conventional art, in the fitting portion of the boot to the inner element, an end surface to which the communication passage is open is widely exposed to the external portion, so that water resulting from the traveling of a vehicle or a high pressure car wash easily intrudes into the inner portion of the boot from the communication passage mentioned above. When the amount of water intruding to the inner portion of the boot is high, the function of the joint may deteriorate due to rust generation in the universal joint or the like.

SUMMARY OF THE INVENTION

An object of the present invention is to prevent water or the like from intruding from an internal pressure adjusting communication passage provided in an end surface of a fitting portion to a member to be mounted in the boot for a universal joint.

According to the present invention, a structure preventing water or the like from intruding in a boot for a universal joint comprises: a communication passage for communicating inner and outer portions of the boot, the communication passage is provided at an end surface of a fitting portion of the boot sealing a connecting space of the universal joint to a member to be mounted at a time of fitting and attaching one end portion of the boot to the member to be mounted.

A protruding shielding portion opposing the end surface of the fitting portion is provided in a close attached portion of the end surface of the fitting portion of the boot in the member to be mounted.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

Figure 1:
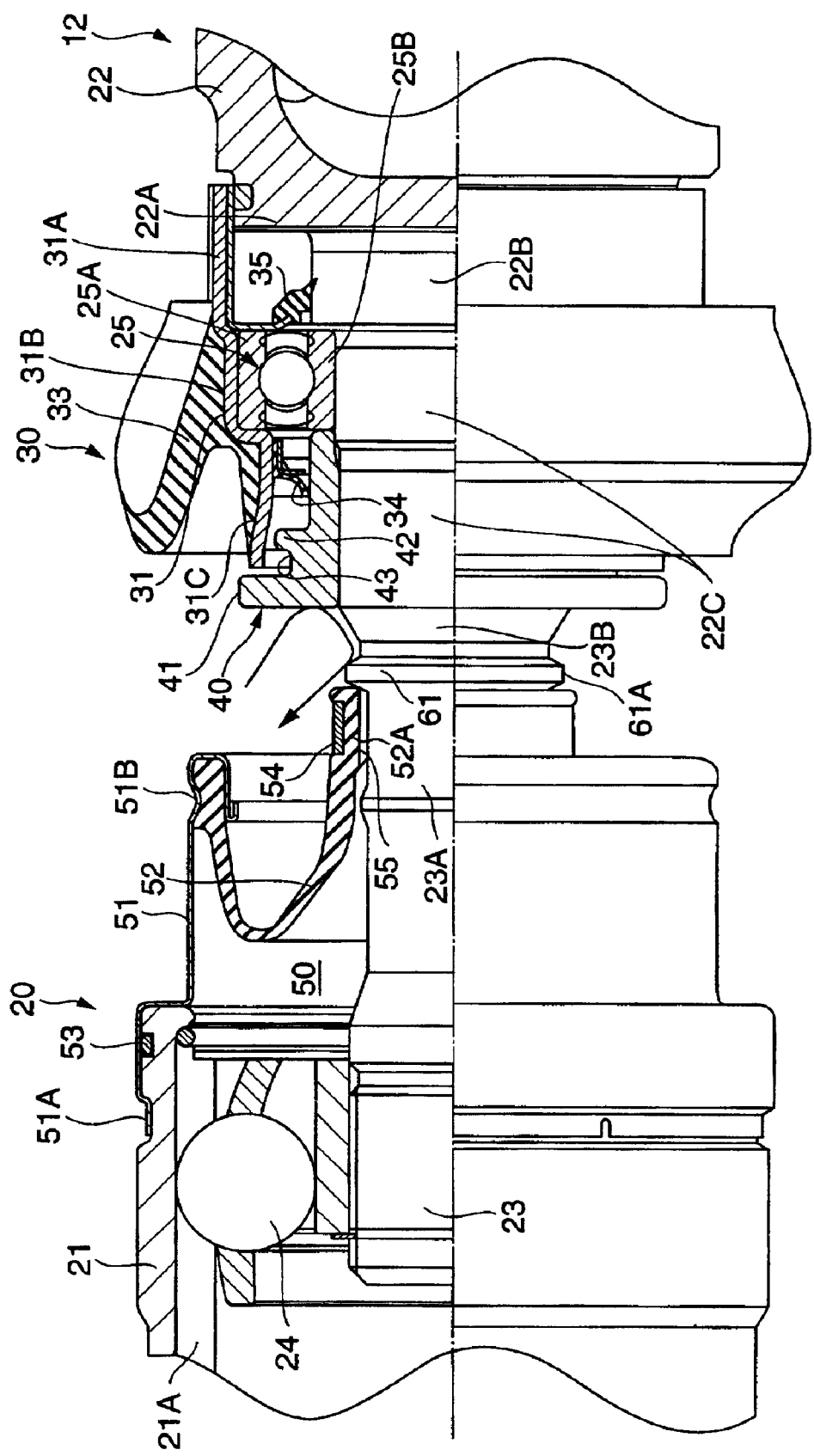
FIG. 1 is a cross sectional view showing a boot for a universal joint according to a first embodiment.
Figure 2:
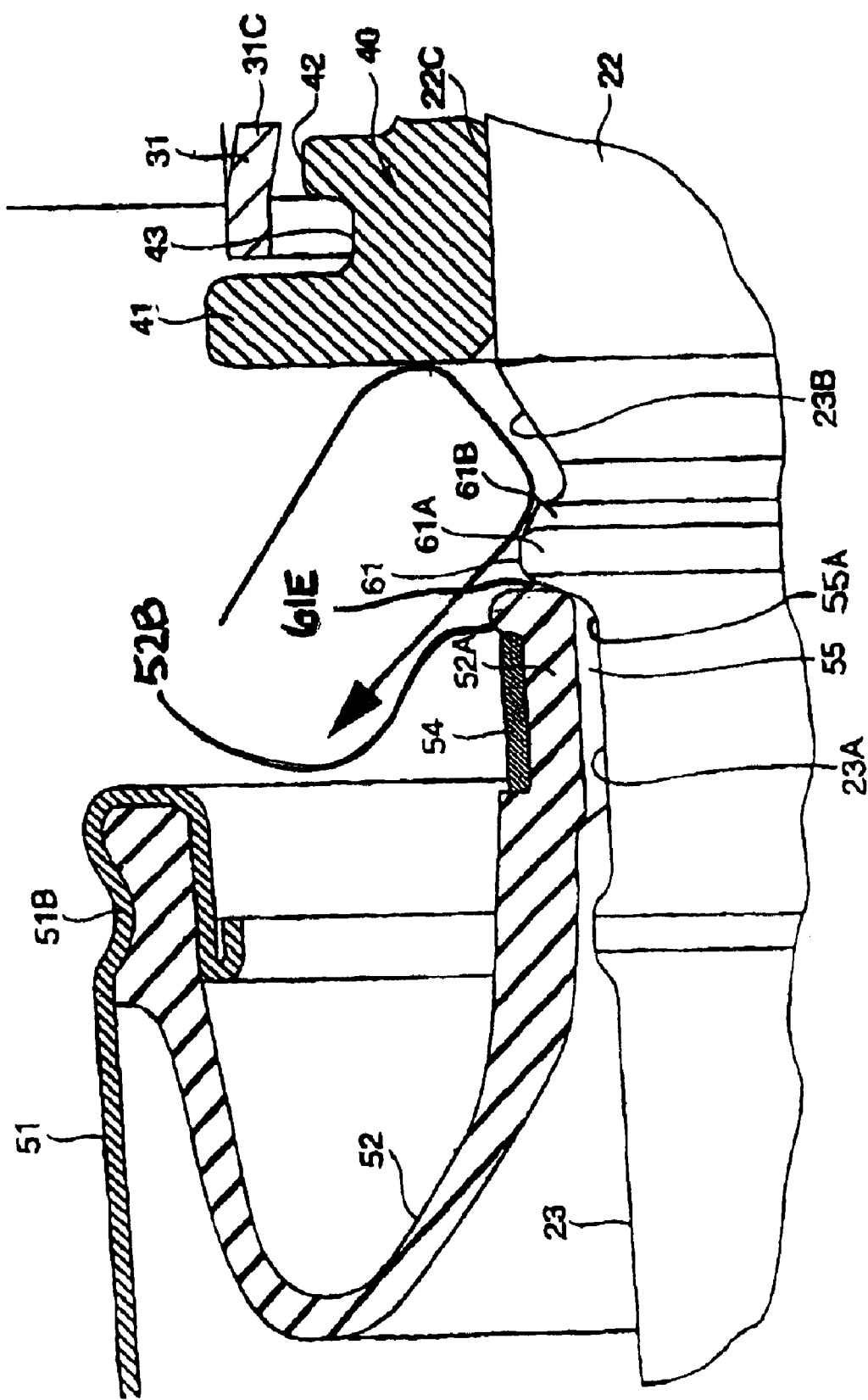
FIG. 2 is an enlarged view of a main portion in FIG. 1.

DESCRIPTION OF THE PREFERRED EMBODIMENTS (First Embodiment) (FIGS. 1 and 2)

FIG. 1 shows a section in which a first propeller shaft (not shown) in an engine side is connected to a second propeller shaft 12 in a rear wheel side by a DOJ (Double Offset Joint) type uniform universal joint (sliding joint) 20.

The universal joint 20 has an outer element 21 connected to the first propeller shaft and an inner element 23 formed in a front end portion of a shaft stuff 22 connected to the second propeller shaft 12. This is structured such that balls 24 are fitted to three grooves 21A provided at three portions between an outer peripheral surface of the inner element 23 and an inner peripheral surface of the outer element 21.

A diameter of the shaft stub 22 of the second propeller shaft 12 is sequentially reduced from a large diameter portion 22A toward the inner element 23 in a front end portion such as a middle diameter portion 22B and a small diameter portion 22C, and the shaft stub 22 is rotatably supported to an annular supporting member 30 via a center bearing 25 mounted to the small diameter portion 22C.

The annular supporting member 30 is structured such that an inner ring and an outer ring (not shown) are bonded to each other via a rubber, elastic, or otherwise flexible member 33. The inner ring 31 is formed in a cylindrical shape in which a diameter is changed, such as a large diameter portion 31A, a middle diameter portion 31B and a small diameter portion 31C. An outer ring 25A of the center bearing 25 is fitted to an inner side of the middle diameter portion 31B, the large diameter portion 31A is extended to a rearward portion covering an outer periphery of the large diameter portion 22A of the shaft stub 22, and the small diameter portion 31C is extended to a forward portion covering an outer periphery of the small diameter portion 22C of the shaft stub 22. In the inner ring 31, seal members 34 and 35 are mounted to respective inner peripheries of the large diameter portion 31A and the small diameter portion 31C, and both of the seal members 34 and 35 seal the center bearing 25 from both sides. The seal member 34 is in slidable contact with an outer periphery of a stopper piece 40 described below in a front surface side of the center bearing 25, and the seal member 35 is in slidable contact with an outer periphery of the middle diameter portion 22B of the shaft stub 22 in a rear surface side of the center bearing 25.

In the universal joint 20, the center bearing 25 fitted to the inner ring 31 of the annular supporting member 30 is mounted to the small diameter portion 22C of the shaft stub 22. In this state, the stopper piece 40 is press-fitted to the small diameter portion 22C of the shaft stub 22. A rear end portion of the stopper piece 40 collides with and aligns with the front-end surface of the center bearing 25 through an inner side of the seal member 34. Accordingly, the rear end surface of the inner ring 25B of the center bearing 25 is brought into contact with a shoulder surface of the middle diameter portion 22B of the shaft stub 22 so as to be positioned, and the front end surface of the inner ring 25B is pressed to the rear end surface of the stopper piece 40 so as to be positioned.

The stopper piece 40 is provided with a large diameter flange portion 41 and a small diameter flange portion 42. The large diameter flange portion 41 of the stopper piece 40 covers a front end opening of the inner ring 31 of the annular supporting member 30, thereby preventing water from intruding into an inner portion of the inner ring 31 receiving the center bearing 25. Water intruding from a gap between the large diameter flange portion 41 and the inner ring 31 is guided by an annular groove 43 between the large diameter flange portion 41 and the small diameter flange portion 42 so as to drop down, thereby preventing the water from intruding into the inner portion of the inner ring 31.

In the universal joint 20, a connecting space 50 between the outer element 21 and the inner element 23 is sealed by using a boot adapter 51 made of a metal thin plate, or other material, and a boot 52 made of a rubber or rubber-like elastic body. A grease for improving the sliding property and the durability of the balls 24 is disposed in the connecting space 50.

A base portion 51A of the boot adapter 51 is inserted and attached around a seal member 53 such as an O-ring or the like provided in the outer periphery of the outer element 21 so as to be caulked and fixed thereto. The boot 52 is provided in such a manner as to be held and attached to a front end portion 51B of the boot adapter 51, and is fitted and attached to an outer peripheral fitting-and-attaching portion 23A of the inner element 23 and is attached and fitted here by a boot band 54.

In this case, a groove-like communication passage 55 for enabling communication between the internal and external portions of the boot 52 is provided at one or more positions on an inner periphery of a fitting portion 52 fitted and attached to the outer peripheral fitting and attaching portion 23 A of the inner element 23 in the boot 52 so as to extend in an axial direction of the fitting portion 52A. Thereby the communication passage 55 opens at an end surface 52B of the fitting portion 52A. Within a range in a radial direction of the end surface 52B of the fitting portion 52A in a boot 52, a range of a groove depth of the communication passage is set so that a joint portion 23B connected to the small diameter portion 22C at the rear of the fitting and attaching potion 23A to which the fitting portion 52A is fitted and attached in the inner element 23 of the shaft tub 22 opposes in such a manner as to be capable of colliding and aligning with a step side surface of formed against the fitting and attaching portion 23A. The communication passage 55 can adjust the internal pressure of the boo 52 (the connecting space 50) for the purpose of avoiding abnormal expansion and compression and a resultant breakage of the boot 52 which may result from the internal pressure change of the boot 52 caused by a temperature change due to heat generated in a universal joint 20, or the internal pressure change of the boot 52 caused by the sliding of the universal joint 20.

In the universal joint 20, an annular protruding shielding portion 61 opposing a wide range of the end surface of the fitting portion 52A is provided in a close contact portion of the end surface of the fitting portion 52A of the boot 52 in the inner element 23 of the shaft stub 22 in the second propeller shaft 12. The shielding portion 61 has a flange portion 61A integrally formed with the joint portion 23B mentioned above connected to the small diameter portion 22C in the inner element 23 of the shaft stub 22. It is essential that the shielding portion 61 (a flange portion 61A) extends to an outward range having a diameter larger than that of a groove bottom position 55A in the communication passage 55 and the diameter is among the range in the radial direction of the end surface 52B of the fitting surface 52A in the boot 52. The fitting surface 52A is fitted and attached to the inner element 23.

According to the present embodiment, the following results can be obtained.

(1) The protruding shielding portion 61 opposes the end surface 52B of the fitting portion 52A of the boots 52 to the inner element 23 so as to shield this from the external portion. This is prevents water or the like applied to the Internal pressure adjusting communication passage 55 open to the end surface from the outer portion, due to traveling of the vehicle, a high pressure car wash, or the like from directly intruding.

(2) The structure can be made simple by integrally forming the protruding shielding portion 61 with the inner element 23.

(3) It is possible to restrict the size of the shielding portion 61 to a necessarily minimum size, and it is possible to make the structure compact and light by constituting the protruding shielding portion 61 by the flange portion 61A provided in the inner element 23.

In this embodiment water striking against the front surface of the stopper piece 40 at the rear of the boots 52 from the front portion due to the traveling of the vehicle, which is directed, from the front surface of the stopper piece 40 toward the end surface of the fitting portion 52A of the boots 52, strikes against the shielding portion 61 (the flange portion 61A) before reaching the end surface 52B of the boots 52. In this manner, it is shielded as shown by a solid line arrow in FIG. 2, thereby being prevented from intruding to the communication passage 55. Here, by setting the rear side surface of the flange portion 61A to a slanted surface 61B, water striking against the flange portion 61A is securely scattered and guided toward the outer portion around the end surface 52B of the fitting portion 52A of the boots 52 by the slanted surface 61B.

Figure 3:
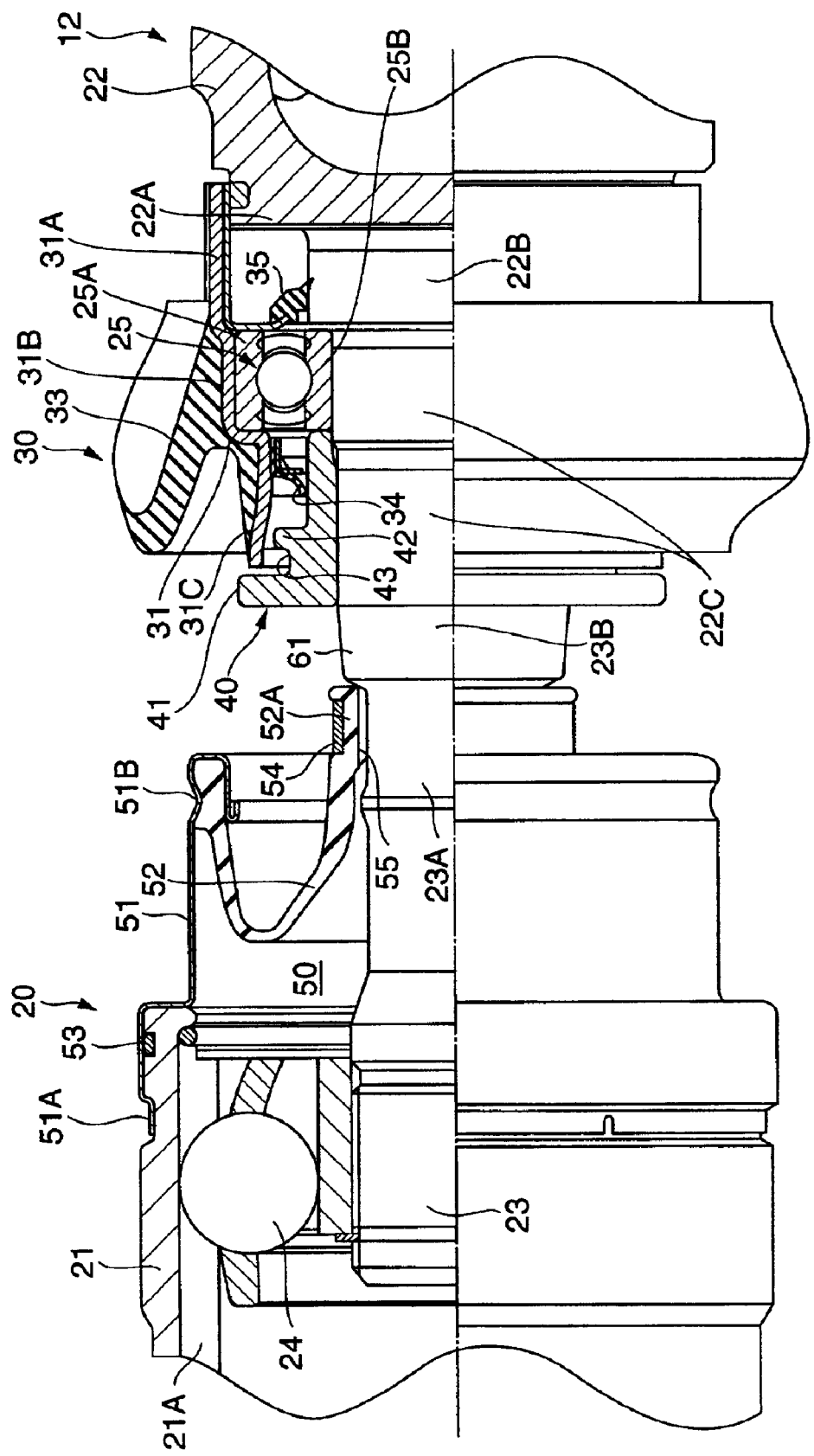
FIG. 3 is a cross sectional view showing a boot for a universal joint according to a second embodiment.
Figure 4:
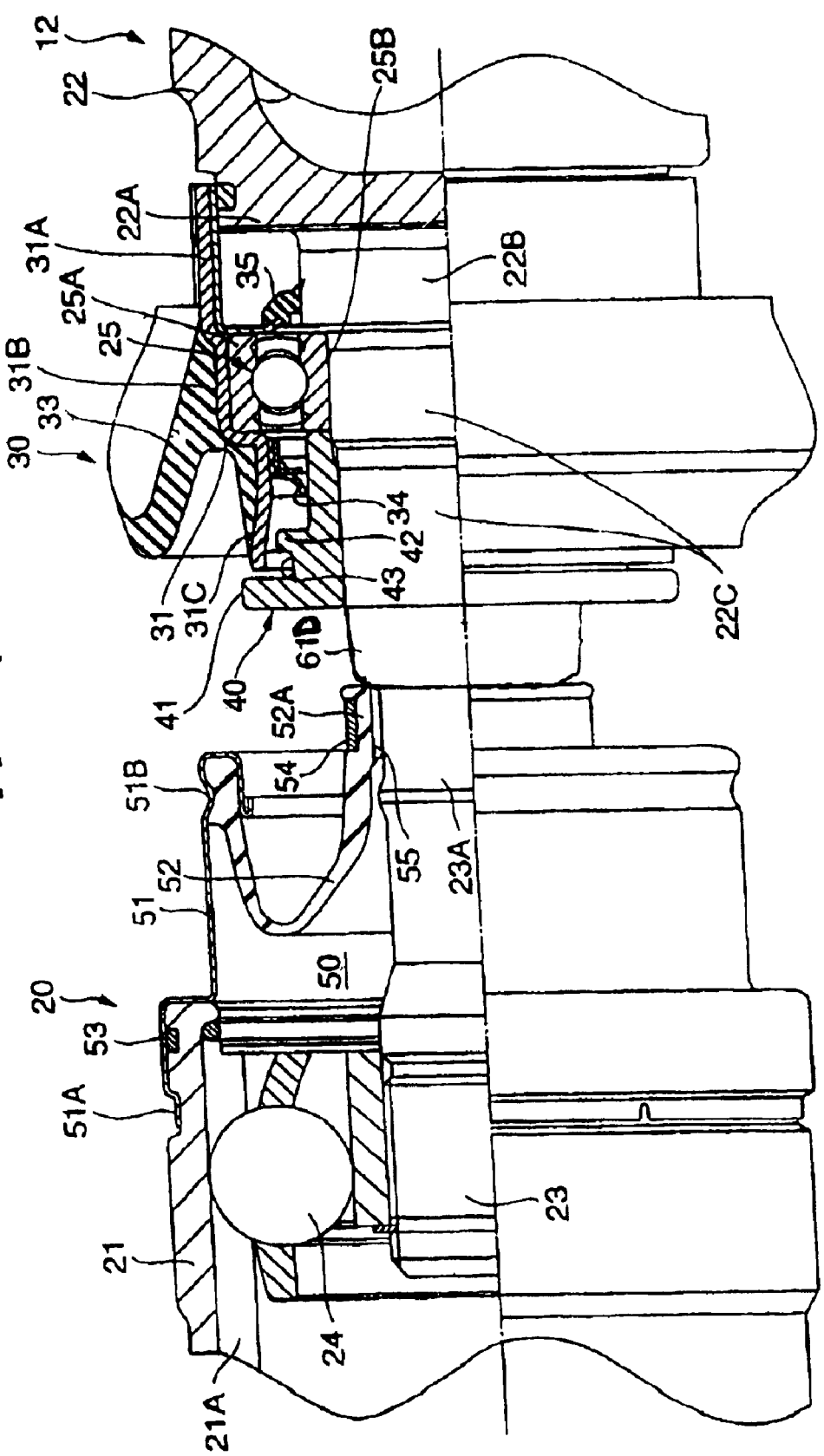
FIG. 4 is a cross sectional view of an alternative embodiment of the invention.

(Second Embodiment) (FIG. 3)

A difference between a second embodiment and the first embodiment exists such that the shielding portion 61 provided in the inner element 23 of the shaft stub 22 in the second propeller shaft 12 is formed by expanding the joint portion 23B connected to the small diameter portion 22C from the rear portion of the fitting portion 52A of the boot 52 in the inner element 23 of the shaft stub 22. It is essential that the shielding portion 61 extends to an outer range having a larger diameter than that of the groove bottom position of the communication passage 55 within the range in the radial direction of the end surface of the fitting portion 52A of the boot 52 fitted and attached to the inner element 23, in an axial view of the inner element 23.

As heretofore explained, embodiments of the present invention have been described in detail with reference to the drawings. However, the specific configurations of the present invention are not limited to the embodiments but those having a modification of the design within the range of the present invention are also included in the present invention. For example, the structure may be made such that the protruding shielding portion 61D is independently provided form the member to be mounted, and is fixed to the member to be mounted according to a fitting and attaching operation or the like.

The protruding shielding portion may be structured to cover the end portion (the end surface and the outer periphery) of the fitting portion in the boot, to the extent that it has a portion opposing to the end surface of the fitting portion of the boot.

The structure may be made such that the communication passage is provided in the end surface of the fitting portion to the outer element in the universal joint of the boot, and the protruding shielding portion opposing the end surface of the fitting portion is provided in the close attached portion of the end surface in the fitting portion of the boot in the outer element.

As mentioned above, according to the present invention, in the boot, for the universal joint, it is possible to prevent water or the like from intruding from the internal pressure adjusting communication passage provided in the end surface of the fitting portion to the member to be mounted.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A boot seal preventing water from intruding in a boot for a universal joint comprising:

a communication passage for communicating inner and outer portions for the boot, the communication passage being provided at an end surface of a fitting portion of the boot said fitting portion sealing a connecting space of the universal joint to a member to be mounted at a time of fitting and said fitting portion attaching an end portion of the boot to the member to be mounted, said fitting portion fixed to the member to be mounted by a boot band, wherein an inclined surface of a protruding shielding portion of the member of opposes the end surface of the fitting portion and at east a portion of the end surface of the fitting portion abuts the inclined surface and the protruding shielding portion extends to an outer range having a larger diameter than that of a groove bottom position of the communication passage and the outer diameter the protruding shielding portion is within a range in a radial direction of about the diameter of a middle of the end surface of the fitting portion to about the diameter of the boot band and wherein the fitting portion has an outer diameter greater than the outer diameter of the boot band.

2. A boot seal preventing water from intruding in a boot for a universal joint as claimed in claim 1, wherein the protruding shielding portion has an annular shape opposing the end surface of the fitting portion.

3. A boot seal preventing water from intruding in a boot for a universal joint as claimed in claim 2, wherein the protruding shielding portion is constituted by a flange portion provided in the member to be mounted.

4. A boot seal preventing water from intruding in a boot for a universal joint as claimed in claim 3, wherein a side surface of the flange portion is opposite the boot and is formed as an inclined surface.

5. A boot seal preventing water from intruding in a boot for a universal joint as claimed in claim 2, wherein a side surface of the protruding shielding portion is opposite the boot and is formed as an inclined surface.

6. A boot seal preventing water from intruding in a boot for a universal joint as claimed in claim 1, wherein the protruding shielding portion is integrally formed with the member to be mounted.

7. A boot seal preventing water from intruding in a boot for a universal joint as claimed in claim 6, wherein the protruding shielding portion is constituted by a flange portion provided in the member to be mounted.

8. A boot seal preventing water from intruding in a boot for a universal joint as claimed in claim 7, wherein a side surface of the flange portion is opposite the boot and is formed as an inclined surface.

9. A boot seal preventing water from intruding in a boot for a universal joint as claimed in claim 6, wherein a side surface of the protruding shielding portion is opposite the boot and is formed as an inclined surface.

10. A boot seal preventing water from intruding in a boot for a universal joint as claimed in claim 1, wherein the protruding shielding portion is constituted by a flange portion provided in the member to be mounted.

11. A boot seal preventing water from intruding in a boot for a universal joint as claimed in claim 10, wherein a side surface of the flange portion is opposite the boot and is formed as an inclined surface.

12. A boot seal preventing water from intruding in a boot for a universal joint as claimed in claim 1, wherein the protruding shielding portion is separately formed from the member to be mounted, and the protruding shielding portion is fixed to the member to be mounted.

13. A boot seal preventing water from intruding in a boot for a universal joint as claimed in claim 1, wherein a side surface of the protruding shielding portion is opposite the boot and is formed as an inclined surface.

* * * * *